Patented Oct. 11, 1932

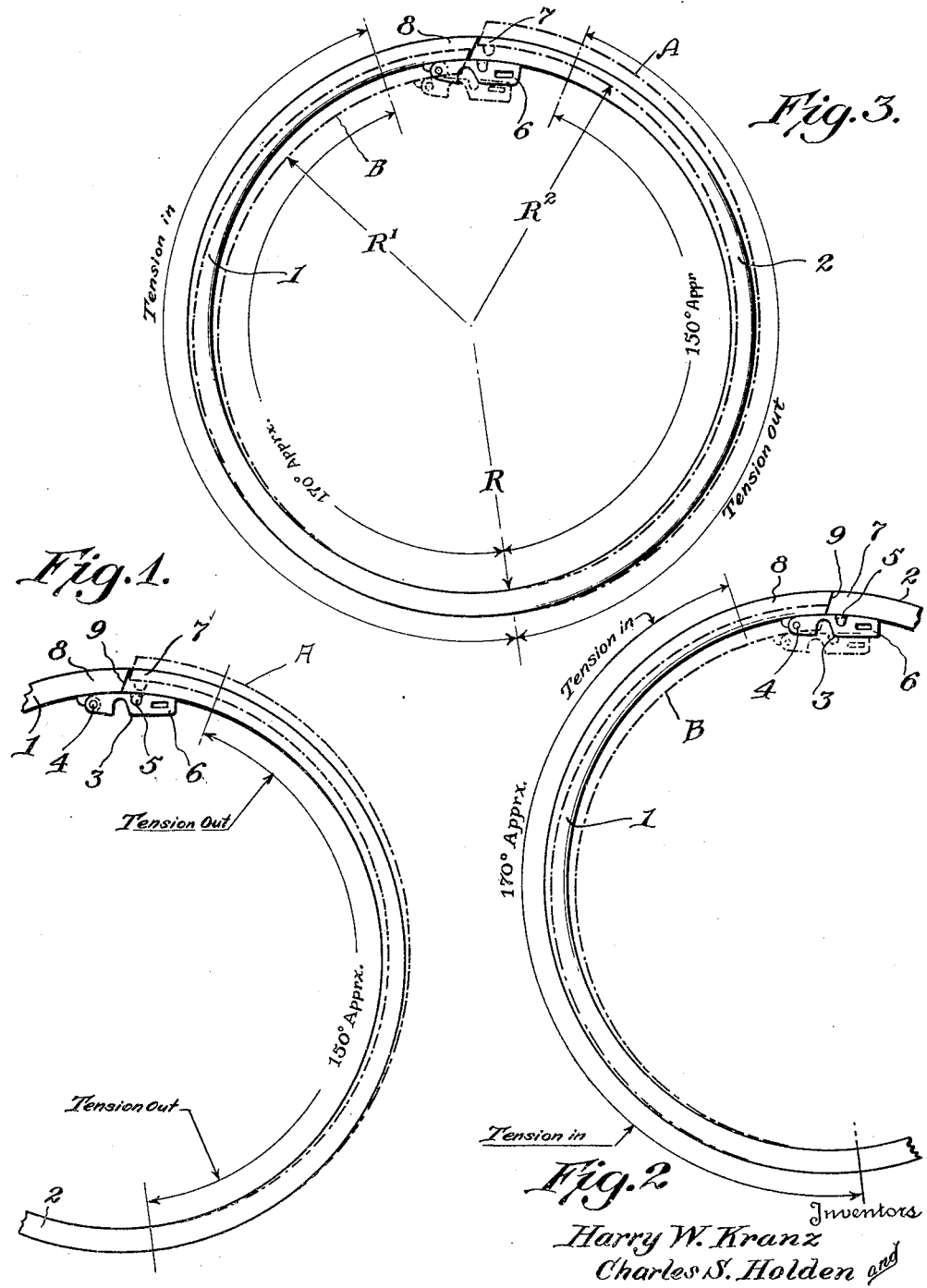

1,881,688

UNITED STATES PATENT OFFICE

HARRY W. KRANZ, CHARLES S. HOLDEN, AND HARRY H. BOUND, OF LAKEWOOD, OHIO, ASSIGNORS TO THE CLEVELAND WELDING COMPANY, OF CLEVELAND, OHIO, A CORPORATION OF OHIO

TIRE CARRYING RIM

Application filed June 5, 1928. Serial No. 282,900.

The present invention, relating, as indicated, to pneumatic tire rims and their manufacture, has more especial reference to transversely split rims of the collapsible and demountable type used in connection with straight-sided tires, and its principal object is the processing such rims in order to positively constrain the adjacent ends to assume their normal and aligned relation after having been radially displaced and overlapped during the operation of removing and replacing the rim relatively to a tire or tire casing.

Transversely split rims of the type referred to, after having been repeatedly sprung and reduced in diameter for the purpose of facilitating their removal from, and replacement within the comparatively inextensible beads of tires or tire casings, usually acquire, and thereafter permanently retain, an undesired and objectionable spiral shape which prevents the ends from assuming their normal and aligned relation to each other; makes it difficult to manipulate the rim in the intended manner; interferes with its proper locking; often damages the casings and inner tubes; and sometimes distorts the rim to such an extent as to impair its fitment to the felly of a wheel. These effects are all attributable to an unavoidable straining or bending of the metal of the rim beyond its limit of elasticity, this resulting in a permanent deformation and making it impossible for the rim to assume its normal annular shape without a quite commonly severe hammering or levering, which frequently results in even greater distortion and makes succeeding collapsing and expanding operations increasingly difficult.

This invention, with the object of providing a tire rim whose ends will reassume their normal relation without forcible assistance, and retain such relation when the rim is expanded into locking position, contemplates working the rim metal to impart additional elasticity; render it capable of more effectually resisting deformation; and able to compensate for any slight deformation produced by improper manipulation. In general, and as illustrative of the type of operations involved, the process may consist in preforming parts of the rim circumference in such a way as to compact and densify the metal; make it more resilient, and either impart a tensional or reactive tendency contrary to the stresses to which the rim is subjected, or a compensatory tensional or recoiling tendency having the effect of neutralizing such distortion as results from collapsing the rim improperly or maintaining it in collapsed condition for considerable periods of time. Inasmuch as this invention is particularly well adapted to rims having transverse chordal splits and therefore more or less distinct overlapping and underlying ends, the actual operations will be described with relation to such ends so designated as the over and under ends, respectively, although the principle is, of course, equally applicable to radially split rims and with substantially the same advantages as attend its application to rims of the character described. The invention, then, in one form and when employed in connection with ribbed rims of rather heavy and rigid metal, may take the form of impact or "spanking" operations performed upon substantially the entire rim circumference, that half of the rim proximate to the under end being subjected to a "tensioning-out" operation performed between dies having substantially the same cross-sectional shape or contour as the rim but a slightly longer radius of peripheral curvature, and that half of the rim proximate to the over end being similarly "tensioned-in" by dies having a slightly shorter circumferential radius of curvature; these two operations serving to increase the resilience of the rim metal and imparting to the under and over halves or segments an augmented ability to resist the radially opposed stresses to which the rim must yield when the under end is stressed radially inward, the over end radially outward and the two ends relatively displaced and brought into overlapping relation. It will be understood that such operations, because of their effect upon the rim metal, compel the over half of the rim to move towards its center when released from a collapsed condition and, in a similar manner, compel the under half to move radially outward when released; these two opposed tendencies being effective to bring the two ends into aligned relation, thereby obviating the difficulties above-mentioned. For rims of thinner and more elastic metal, either operation alone, that is, a tensioning-in of the over half or a tensioning-out of the under half may be sufficient for accomplishing the result desired, the former operation, as has been noted, producing the effect by causing the over end to move or tend to move with increased force towards the rim center and the latter operation causing the under end to move outwardly, either or both combined being advantageous in preventing permanent deformation and insuring certain end alignment.

To the accomplishment of the foregoing and related ends, said invention, then, consists of the means hereinafter fully described and particularly pointed out in the claims. The annexed drawing and the following description set forth in detail one method and one type of product exemplifying our invention, such disclosed procedure and type of product constituting, however but one of several various applications of the principle of our invention.

In said annexed drawings:—

Fig. 1 is a fragmentary side elevational view showing a rim with one portion thereof formed in accordance with the principles of our invention; Fig. 2 is a fragmentary side elevational view showing a rim with another portion formed in accordance with the principles comprising our invention and Fig. 3 is a side elevational view of a rim having its opposite ends formed in accordance with the principles of our invention.

In the drawings, there is shown a tire rim 1 having radially projecting side flanges 2 and a combination locking and manipulating device 3, this device being pivoted to one end as at 4 and to the other and adjacent end as at 5. By lifting the lever extension 6 and revolving it around the pin 4 (the end 7 being recessed or notched in advance of the pivot 5) into a reversed position in recumbent relation to the end 8, the under end 7, so called because of the angularity of the split 9, and the over end 8, so called for the same reason, may be radially displaced and then forcibly brought into overlapping positions, the end 7 being on the inside and the end 8 on the outside, thereby reducing the diameter of the rim and permitting it to be easily placed within or removed from a tire or tire casing of any pattern to which rims of this type are adapted. This operation, especially when repeated and the rim maintained in a flexed condition for some considerable time, will result in permanently distorting the rim ends and preventing them from freely taking their intended coincident or exactly abutting relation; due to the metal having been strained beyond its elastic limit and given a permanent out-of-round "set" with the consequences heretofore mentioned.

A rim formed in such a fashion so that even after repeated distortions or after being maintained in distorted shape for a considerable time, the ends of the rim will still take their required positions without any out-of-round "set" is illustrated in Fig. 1. In this figure, the end of the rim normally moved inwardly when the rim is collapsed for the purpose of removing a tire therefrom, is given a permanent set-up which would cause such end or portion to occupy the broken line position indicated at (A), that is the normal curvature of this section of the rim is greater than the curvature of the rim contacting portion of the tire which is to be carried by such rim, so that this portion has a tendency to spring outwardly and hence, the joint between the rim ends is maintained closed at all times when the latching means is in the full line position illustrated in this figure.

In Fig. 2, is illustrated a rim in which the rim end opposite to that described in connection with Fig. 1 is illustrated as having a normally unrestrained curvature, as indicated by the broken lines at (B) less than the curvature of the rim contacting portion of the tire, so that this rim end has a tendency to normally move inwardly against the inclined seat 9, thereby maintaining the joint closed, unless the rim is collapsed by means of the latch.

In Fig. 3 is illustrated a rim in which both ends are deformed respectively, as illustrated and described in connection with Figs. 1 and 2, so that a combined effect of both rim ends is to maintain the joint between such ends tightly closed at all times, unless the rim is collapsed by means of the latch.

In the drawing R is employed to designate the radius which the rim should have to support the tire to be carried thereby. $R^1$ has been employed to designate the radius to which section B is deformed and $R^2$ has been employed to designate the radius to which section A has been deformed.

As before intimated, ribbed or heavy rims are desirably subjected to both the tensioning-in and the tensioning-out operations, but lighter rims having no ribs and a comparatively greater natural resiliency may be subjected to either operation alone, such operation preferably comprising a tensioning-in of the over segment of the rim; it having been discovered that the rolling process by which the rims are formed from flat stock, when carried out in a particular manner, results in a certain amount of additional working that makes it unnecessary to tension-out the under segment, which, during the rolling, is sufficiently treated to enable it to resist the stresses occurring in practice, it being understood that the under segment or half receives the most severe treatment in the collapsing operation, in fact, the over segment remaining, as is the case, in about its usual expanded position is subjected to hardly any deforming stresses and therefore may not become detrimentally deformed or distorted.

While our invention has been described with relation to rims having transverse chordal splits having attached means for assisting in preventing reverse overthrow, it will be understood that the operations involved are also applicable to such split rims without other means for preventing reverse overthrow, to radially split rims without such means and to radially split rims that embody such means, the broad object, as before stated, being to adapt the rim to effectively resist distorting strains and to insure that the ends will meet in coincident relation even after having been repeatedly displaced and overlapped during the necessary rim removing and replacing operations.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. A transversely split tire rim having part of its circumference bent to a normal unstrained curvature greater than the tire bead curvature, and part of its circumference bent to a normal unstrained curvature smaller than the tire bead curvature.

2. A transversely split tire rim having part of its circumference bent to a normal unstrained curvature slightly larger than the curvature of the rim-engaging periphery of the tire to be supported thereby.

3. A transversely split tire rim having part of its circumference bent to a normal unstrained curvature slightly smaller than the curvature of the rim-engaging periphery of the tire to be supported thereby.

4. A transversely split collapsible tire rim having parts of its circumference provided with curvatures urging its ends to move out of alignment in directions opposite to the disalignment produced by collapsing, and means for preventing such movement.

5. A tire rim having slightly overlapping ends defined by a transverse chordal split, the part of said rim proximate to the under end being bent to a larger radius of curvature than the radius of curvature of the rim-engaging periphery of the tire to be supported thereby.

6. A tire rim having slightly overlapping ends defined by a transverse chordal split, the part of said rim proximate to the over end being bent to a smaller radius of curvature than the radius of curvature of the rim-engaging periphery of the tire to be supported thereby.

7. A tire rim having slightly overlapping ends defined by a transverse chordal split, the part of said rim proximate to the over end having a normal unstrained curvature less than the curvature of the rim-engaging periphery of the tire, and the part of said rim proximate to the under end having a normal curvature greater than the curvature of the rim-engaging periphery of the tire.

8. A transversely split tire rim having an inwardly displaceable end having a normal unstrained curvature greater than the curvature of the rim-engaging periphery of the tire.

9. A transversely split tire rim having an inwardly displaceable end having a normal unstrained curvature greater than the curvature of the rim-engaging periphery of the tire.

10. A tire rim having under and over ends defined by a transverse chordal split, the said rim having a normal unstrained curvature less than the curvature of the rim-engaging periphery of the tire through an arc of about 170 degrees extending from near such end to a point beyond the diametral point, and having a normal unstrained curvature greater than the curvature of the rim-engaging periphery of the tire through an arc of about 150 degrees from such diametral point toward the under end.

Signed by us, this 4th day of June, 1928.
  HARRY W. KRANZ.
  CHARLES S. HOLDEN.
  HARRY H. BOUND.